(12) United States Patent
Satake et al.

(10) Patent No.: US 6,613,855 B1
(45) Date of Patent: Sep. 2, 2003

(54) POLYMERIZABLE RESIN, AND CURED RESINS, INSULATORS, COMPONENTS OF ELECTRICAL APPLIANCES, AND ELECTRICAL APPLIANCES MADE BY USING THE SAME

(75) Inventors: Munekazu Satake, Kyoto (JP); Masahito Inoue, Kyoto (JP); Takao Saito, Kyoto (JP)

(73) Assignee: Sanyo Chemical Industries, Ltd., Kyoto (JP)

( * ) Notice: Subject to any disclaimer, the term of this patent is extended or adjusted under 35 U.S.C. 154(b) by 0 days.

(21) Appl. No.: 09/446,866

(22) PCT Filed: Jun. 30, 1998

(86) PCT No.: PCT/JP98/02912

§ 371 (c)(1),
(2), (4) Date: Mar. 23, 2000

(87) PCT Pub. No.: WO99/00435

PCT Pub. Date: Jan. 7, 1999

(30) Foreign Application Priority Data

Apr. 9, 1997 (JP) ............................... 9-257871
Jun. 30, 1997 (JP) ............................... 9-190673

(51) Int. Cl.$^7$ ................................ C08F 14/18
(52) U.S. Cl. ....................... 526/247; 526/245; 526/319; 526/332; 526/347
(58) Field of Search ................. 526/247, 245, 526/319, 347, 332

(56) References Cited

U.S. PATENT DOCUMENTS 5,719,230 A * 2/1998 Ando .................... 525/29

FOREIGN PATENT DOCUMENTS

| JP | 60-248704 | 12/1985 |
|----|-----------|---------|
| JP | 61-9480 | 1/1986 |
| JP | 61-12777 | 1/1986 |
| JP | 62-34924 | 2/1987 |
| JP | 64-69628 | 3/1989 |
| JP | 64-69629 | 3/1989 |
| JP | 1-113425 | 5/1989 |
| JP | 1-113426 | 5/1989 |
| JP | 1-135856 | 5/1989 |
| JP | 1-239027 | 9/1989 |
| JP | 2-215806 | 8/1990 |
| JP | 2-227424 | 9/1990 |
| JP | 2-276842 | 11/1990 |
| JP | 3-122137 | 5/1991 |
| JP | 3-148882 | 6/1991 |
| JP | 4-88053 | 3/1992 |
| JP | 6-136218 | 5/1994 |
| JP | 7-508779 | 9/1995 |
| JP | 8-73872 | 3/1996 |
| JP | 8-259784 | 10/1996 |

* cited by examiner

Primary Examiner—Fred Zitomer
(74) Attorney, Agent, or Firm—Connolly Bove Lodge & Hutz LLP

(57) ABSTRACT

The invention provides a polymerizable resin capable of forming thin insulating films excellent in heat resistance, solvent resistance, low water absorption, insulating property, low dielectric constant, etc. The polymerizable resin comprises a copolymer of a monomer (1) represented by the general formula (1) and at least one monomer selected from the group consisting of monomers (2) to (6) respectively represented by the general formulas (2) to (6), wherein the weight ratio of the monomer (1)/[sum total of monomers (2) to (6)] is 5/95 to 95/5 and the number average molecular weight of the copolymer is 2000 to 1000000:

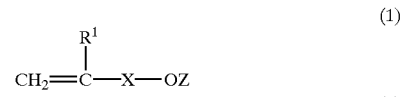

(1)

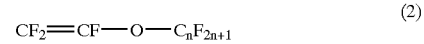

(2)

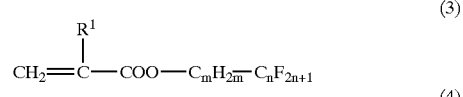

(3)

(4)

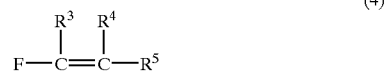

(5)

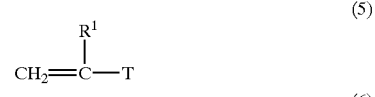

(6)

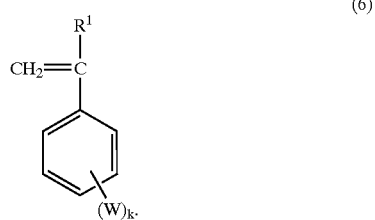

4 Claims, No Drawings

POLYMERIZABLE RESIN, AND CURED RESINS, INSULATORS, COMPONENTS OF ELECTRICAL APPLIANCES, AND ELECTRICAL APPLIANCES MADE BY USING THE SAME

TECHNICAL FIELD

The present invention relates to a cured resin obtained by curing a polymerizable resin capable of forming thin films excellent in various characteristics, such as heat resistance, solvent resistance, low water absorption, insulating properties, low dielectric constant, and chemical resistance, in particular having a low dielectric constant, which constitutes an over coating material or interlayer insulating material for use in circuit boards to be used in various kinds of electrical machinery and apparatus, electronic parts, semiconductor devices and the like, to an insulating material comprising said cured resin, and to electrical machinery and apparatus parts and electrical machinery and apparatus in which said insulating material is used.

The range of application of said polymerizable resin and cured resin is not limited to the fields mentioned above. They can be used in various fields by making efficient use of their excellent heat resistance, solvent resistance and other characteristics, in particular in fields which require thin films other than the fields mentioned above.

BACKGROUND ART

Various insulating materials, for example passivation films, solder resists, resists for plating, interlayer insulating materials and moisture-proof protective films, are known as over coating materials, interlayer insulating materials or the like for use in semiconductors, ICs, hybrid ICs, wiring substrates, display devices, display parts and the like in the electronics industry. The recent trends toward miniaturization, high density constitution and high speed operation of electronic parts require that such insulating materials should have higher performance characteristics and higher reliability.

Epoxy resin compositions, polyimide resins and polybutadiene compositions, among others, are known as the resin compositions constituting such insulating materials. However, epoxy resin compositions and polyimide resins have a problem in moisture resistance and a problem concerning their electric characteristics, in particular their high dielectric characteristics in high frequency ranges. Polybutadiene resins have good moisture resistance and dielectric characteristics but have a problem in heat resistance.

Novel materials are thus demanded to meet such characteristics required for over coating materials, interlayer insulating materials and like insulating materials. Attempts have been made to use polyolefin resins and polyphenylene ether resins, which have good electrical characteristics. However, polyolefin resins and polyphenylene ether resins are thermoplastic resins and therefore their heat resistance is not fully satisfactory. Another problem is that, in multilayer formation, the lower layer is damaged by the solvent.

To solve such problems, a method of improving the heat resistance, solvent resistance and other properties of copolymers of a norbornene type monomer and ethylene by sulfur crosslinking, organic peroxide crosslinking, electron beam crosslinking or radiation crosslinking, for instance, has been proposed (Japanese Kokai Publication Sho-62-34924). However, it was revealed that such a method encounters problems in applying it to over coating materials, interlayer insulating materials or like insulating materials in view of residual sulfur, storage stability of a mixture and necessity of a considerable equipment investment, among others.

A method of improving the heat resistance, solvent resistance and other properties by introducing an epoxy group to cyclic olefin resins, typically norbornene resins, and curing the resulting resin compositions, with a crosslinking agent dispersed therein, has also been proposed (Japanese Kokai Publication Hei-8-259784). However, said method has a problem concerning dielectric characteristics because the cured resins obtained by such a method using an epoxy group and a crosslinking agent, which are highly polalizable, as crosslinking functional groups.

Further, propargyl- or allyl-substituted polyphenylene ethers, double bond- or double bond-containing polyphenylene ethers and unsaturated carboxylic acid- or acid anhydride-modified polyphenylene ethers have been proposed (Japanese Kokai Publication Hei-1-69628, Japanese Kokai Publication Hei-1-69629, Japanese Kokai Publication Hei-1-113425, Japanese Kokai Publication Hei-1-113426, Japanese Kokai Publication Hei-1-239017, etc.). These, however, are poor in curing reactivity, in particular curing reactivity in oxygen (air), since an allyl group, olefinically unsaturated bond or unsaturated carboxylic acid is used as their curing functional group. For attaining satisfactory curing, there is a limitation that it is necessary to conduct curing in an inert gas atmosphere such as nitrogen.

SUMMARY OF THE INVENTION

In view of the foregoing, the present invention has for its object to provide a polymerizable resin capable of forming a cured resin suited for use as an over coating material, interlayer insulating material or the like and excellent in various characteristics, such as heat resistance, solvent resistance, low water absorption, insulating properties, low dielectric constant, adhesion, chemical resistance and processability, a cured resin obtained by said polymerizable resin, an insulator comprising said cured resin, and electrical machinery and apparatus parts and electrical machinery and apparatus in which said insulator is used.

The first aspect of the present invention is concerned with a polymerizable resin which comprises a copolymer of a monomer (1) represented by the general formula (1) given below and one or more monomers selected from the group consisting of monomers (2) to (6) respectively represented by the general formulas (2) to (6) given below, wherein the weight ratio of the monomer (1)/[sum total of monomers (2) to (6)] is 5/95 to 95/5 and the number average molecular weight of said copolymer is 2000 to 1000000;

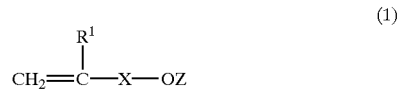

(1)

[In the formula, $R^1$ represents a hydrogen atom or a methyl group, X represents $COOR^2$ or $OR^2$, $R^2$ represents an alkylene group containing 1 to 6 carbon atoms and may optionally be substituted with a hydrokyl group or a halogen atom, and Z represents an alkenyl group containing 2 to 5 carbon atoms.];

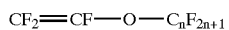
(2)

[In the formula, n is an integer of 1 to 10. ];

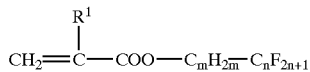
(3)

[In the formula, $R^1$ represents a hydrogen atom or a methyl group, m is an integer of 0 to 6 and n is an integer of 1 to 10. ];

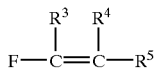
(4)

[In the formula, $R^1$ represents a hydrogen or fluorine atom, $R^4$ represents a hydrogen, chlorine or fluorine atom and $R^5$ represents a hydrogen or fluorine atom or a trifluoromethyl group.];

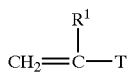
(5)

[In the formula, $R^1$ represents a hydrogen atom or a methyl group, T represents $COOR^6$ or ($R^6_1$ and $R^6$ represents a cyclic alkyl or cyclic alkenyl group containing 3 to 15 carbon atoms and may partly be substituted with a hydroxyl group or a halogen atom.];

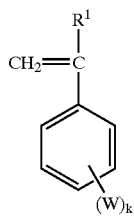
(6)

[In the formula, $R^1$ represents a hydrogen atom or a methyl group, W represents an alkyl group, a hydroxyl group or a halogen atom and k is an integer of 0 to 5.];

The second aspect of the present invention is concerned with a method of producing a polymerizable resin which comprises copolymerizing the monomer (1) represented by the above general formula (1) and one or more monomers selected from the monomers (2) to (6) respectively represented by the above general formulas (2) to (6) in a proportion such that the weight ratio of the monomer (1)/[sum total of monomers (2) to (6) ] amounts to 5/95 to 95/5.

The third aspect of the present invention is concerned with a polymerizable resin which comprises one resin or a mixture of two or more resins selected from the group consisting of a cyclic olefin resin ($A_0$), a resin ($A_1$) prepared by substitution of at least one hydrogen atom of a methyl, methylene or methine group in said cyclic olefin resin ($A_0$) with an organic group represented-by the general formula (7) given below and having a number average molecular weight of 2000 to 1000000, a polyphenylene ether resin ($B_0$), a resin ($B_1$) prepared by substitution of at least one hydrogen atom of a methyl, methylene or methine group in said polyphenylene ether resin ($B_0$) with an organic group represented by the general formula (7) given below and having a number average molecular weight of 2000 to 100000, a polyolefin resin ($C_0$), a resin ($C_1$) prepared by substitution of at least one hydrogen atom of a methyl, methylene or methine group in said polyolefin resin ($C_0$) with an organic group represented by the general formula (7) given below and having a number average molecular weight of 2000 to 1000000 [to the exclusion of one resin or a mixture of two or more resins selected from the group consisting of said cyclic olefin resin ($A_0$), polyphenylene ether resin ($B_0$) and polyolefin resin ($C_0$)];

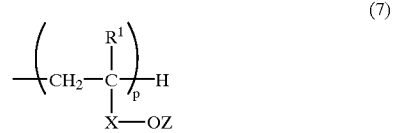
(7)

[In the formula, $R^1$ represents a hydrogen atom or a methyl group, X represents $COOR^2$ or $OR^2$, $R^2$ represents an alkylene group containing 1 to 6 carbon atoms and may optionally be substituted with a hydroxyl group or a halogen atom, Z represents an alkenyl group containing 2 to 5 carbon atoms, and p is an integer not smaller than 1.].

The fourth aspect of the present invention is concerned with a method of curing the polymerizable resin in accordance with the first or second aspect of the present invention which comprises subjecting said resin to cationic polymerization or radical polymerization.

The fifth aspect of the present invention is concerned with a cured resin obtained by the above curing method.

The sixth aspect of the present invention is concerned with an insulator which comprises the above cured resin or an insulator which comprises a cured resin obtained by subjecting a polymerizable resin (D) having at least one alkenyl group of 2 to 5 carbon atoms within the molecule and a dielectric constant of not more than 3.0 to cationic polymerization or radical polymerization.

The seventh aspect of the present invention is concerned with an electrical machinery or apparatus part or electrical machinery or apparatus in which the above insulator is incorporated.

DETAILED DESCRIPTION OF THE INVENTION

The first aspect of the present invention provides a polymerizable resin which comprises a copolymer of an alkenyl ether group-containing monomer (1) represented by the general formula (1) given below and one or more monomers selected from the group consisting of monomers (2) to (6) respectively represented by the general formulas (2) to (6) given below, wherein the weight ratio of the monomer (1)/[sum total of monomers (2) to (6)] is 5/95 to 95/5 and the number average molecular weight of said copolymer is 2000 to 1000000.

In the above definition, the expression "the group consisting of monomers (2) to (6) respectively represented by the general formulas (2) to (6) given below" means "the group consisting of a monomer (2) represented by the general formula (2) given below, a monomer (3) represented by the general formula (3) given below, a monomer (4) represented by the general formula (4) given below, a monomer (5) represented by the general formula (5) given below and a monomer (6) represented by the general formula (6) given below".

Said monomer (1) is represented by the following general formula (1):

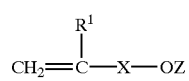

(1)

In the above general formula (1), $R^1$ represents a hydrogen atom or a methyl group. Among them, the methyl group is preferred since, in that case, resins having a low dielectric constant can be obtained. X represents $COOR^2$ or $OR^2$ and $R^2$ represents an alkylene group containing 1 to 6 carbon atoms, which may optionally be substituted with a hydroxyl group or a halogen atom. Said alkylene group is, for example, methylene group, ethylene group, propylene group or butylene group. Preferred as $R^2$ is an unsubstituted alkylene group containing 1 to 6 carbon atoms since, in that case, resins having a low dielectric constant can be obtained.

Z represents an alkenyl group containing 2 to 5 carbon atoms. Therefore, the above monomer (1) contains an alkenyl ether group represented by ZO. As said alkenyl group, there may be mentioned propenyl, vinyl, allyl and the like. From the viewpoint of polymerizable functional group reactivity, propenyl is preferred. When those compounds of the above general formula (1) have X between the carbon atom to which X is bound and ZO, said compounds improve the physical properties (e.g. brittleness, impact resistance) of the resins obtained upon polymerization of the polymerizable resins, as compared with those compounds which have no X.

As specific examples of the monomer (1) represented by the above general formula (1), there may be mentioned, among others, propenoxyethyl acrylate, propenoxyethyl methacrylate, propenoxyethyl vinyl ether, propenoxypropyl acrylate, propenoxypropyl methacrylate, propenoxypropyl vinyl ether, 3-propenoxy-2-hydroxypropyl acrylate, 3-propenoxy-2-hydroxypropyl methacrylate, 3-propenoxy-2-chloropropyl acrylate, 3-propenoxy-2-chloropropyl methacrylate, propenoxybutyl methacrylate, propenoxyhexyl methacrylate and like propenyl ether-containing monomers; vinyloxyethyl methacrylate and like vinyl ether-containing monomers; allyloxyethyl methacrylate and like vinyl ether-containing monomers.

Among the above monomers (1), propenyl ether group-containing monomers are preferred from the viewpoint of polymerizable functional group reactivity and, further, propenoxyethyl acrylate, propenoxyethyl methacrylate, propenoxyethyl vinyl ether, propenoxypropyl acrylate, propenoxypropyl methacrylate, propenoxypropyl vinyl ether, propenoxybutyl methacrylate and propenoxyhexyl methacrylate are preferred since they give resins having a low dielectric constant.

The monomer (2) mentioned above is represented by the following general formula (2):

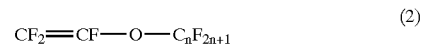

(2)

In the above general formula (2), n is generally an integer of 1 to 10.

As specific examples of the above monomer (2), there may be mentioned perfluoropropyl vinyl ether and the like.

The monomer (3) mentioned above is represented by the following general formula (3):

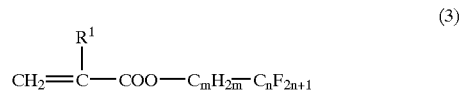

(3)

In the above general formula (3), $R^1$ represents a hydrogen atom or a methyl group. Among them, the methyl group is preferred since, in that case, resins having a low dielectric constant can be obtained. m is generally an integer of 0 to 6 and n is an integer of 1 to 10.

As specific examples of the above monomer (3), there may be mentioned perfluoroethyl acrylate, perfluoroethyl methacrylate and the like. Among said monomers, perfluoroethyl methacrylate is preferred since it gives resins having a low dielectric constant.

The monomer (4) mentioned above is represented by the following general formula (4):

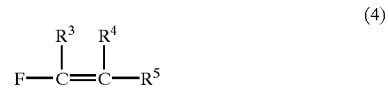

(4)

In the above general formula (4), $R^3$ represents a hydrogen or fluorine atom. $R^4$ represents a hydrogen, chlorine or fluorine atom. $R^5$ represents a hydrogen or fluorine atom or a trifluoromethyl group.

As specific examples of the above monomer (4), there may be mentioned, among others, vinyl fluoride, vinylidene fluoride, chlorotrifluoroethylene, tetrafluoroethylene and hexafluoropropylene. Among these, tetrafluoroethylene and hexafluoropropylene are preferred since they give resins having a low dielectric constant.

The monomer (5) mentioned above is represented by the following general formula (5):

(5)

In the above general formula (5), $R^1$ represents a hydrogen atom or a methyl group. T represents $COOR^6$ or $OR^6$ and $R^6$ represents a cyclic alkyl or cyclic alkenyl group containing 3 to 15 carbon atoms, which may partly be substituted with a hydroxyl group or a halogen atom. As said cyclic alkyl or alkenyl group containing 3 to 15 carbon atoms, there may be mentioned, among others, isobornyl, admantyl, cyclohexyl and cyclohexenyl.

As the above monomer (5), there may be mentioned, among others, (meth)acrylate monomers having the above cyclic alkyl or cyclic alkenyl group and alkenyl ether monomers having the above cyclic alkyl or cyclic alkenyl group.

The monomer (6) mentioned above is represented by the following general formula (6):

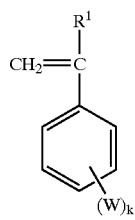

(6)

In the above general formula (6), $R^1$ represents a hydrogen atom or a methyl group. W represents an alkyl or hydroxyl group or a halogen atom. k is an integer of 0 to 5.

As the styrenes represented by the above general formula (6), there may be mentioned styrene; α-methylstyrene; styrenes substituted with a halogen atom, a hydroxyl group and/or an alkyl group such as methyl. Said halogen atom is, for example, fluorine, chlorine or bromine. The number of substituents is 0 to 5.

As specific examples of the above monomer (6), there may be mentioned, among others, o-methylstyrene, m-methylstyrene, p-methylstyrene, α-bromostyrene, o-bromostyrene, m-bromostyrene, p-bromostyrene, o-chlorostyrene, m-chlorostyrene, p-chlorostyrene, o-fluorostyrene, m-fluorostyrene, p-fluorostyrene, 2,6-dichlorostyrene, 2,16-difluorostyrene and 2,3,4,5,6-pentafluorostyrene.

Among these, styrene, o-methylstyrene, p-methylstyrene, o-fluorostyrene, m-fluorostyrene, p-fluorostyrene, 2,6-difluorostyrene and 2,3,4,5,6-pentafluorostyrene are preferred since they give resins having a low dielectric constant and rich in heat resistance.

The above polymerizable resin may be a binary copolymer obtained by copolymerization of the monomer (1) and one of the monomer (2), monomer (3), monomer (4), monomer (5) and monomer (6) (hereinafter referred to as monomers (2) to (6) for short) or a multicomponent copolymers obtained by copolymerization of the monomer (1) and two or more of the monomers (2) to (6).

When the dielectric constant, heat resistance and processability of the product polymerizable resin are taken into consideration, multicomponent copolymers are preferred and particularly preferred combinations are the combination of monomers (1), (2) and (3), the combination of monomers (1), (2) and (4), the combination of monomers (1), (3) and (4), the combination of monomers (1), (2) and (5), the combination of monomers (1), (2) and (6), the combination of monomers (1), (5) and (6) and the combination of monomers (1), (2), (5) and (6).

In the above copolymer, the monomer composition is such that the weight ratio of monomer (1)/[sum total of monomers (2) to (6)] amounts to 5/95 to 95/5, preferably 20/80 to 70/30. In the case of multicomponent polymers, the composition of monomers (2) to (6) is preferably such that the weight ratio [sum total of monomers (2) to (4)]/[sum total of monomers (5) and (6)] amounts to 10/90 to 90/10, more preferably 30/70 to 70/30, since resins having a low dielectric constant can then be obtained.

If the ratio monomer (1)/[sum total of monomers (2) to (6)] is lower than 5/95, the resin after curing will have poor heat resistance. If it is in excess of 95/5, the resin after curing will be poor in resin strength.

The mode of binding of the monomers (1) to (6) in the above polymerizable resin may be block-like or random. The above polymerizable resin has a number average molecular weight (when analyzed by GPC using cyclohexane as the solvent) of 2000 to 1000000, preferably 30,000 to 600,000.

If the molecular weight of the above polymerizable resin is lower than 2000, the resin before and after curing will be poor in resin strength and heat resistance. If said molecular weight is higher than 1000000, the resin before curing will show poor processability.

In the polymerizable resin in accordance with the first aspect of the present invention, there may be incorporated a filler or some other additives in amounts in which the properties of the resin will not affected so that the resin may be provided with desired performance characteristics. Additives such as fillers, antioxidants, heat stabilizers, antistatic agents, plasticizers, pigments, dyes, colorants, fire retardants, fire retardant auxiliaries, and/or one or more other thermoplastic resins or heat-polymerizable resins may be incorporated therein. As specific additives, there may be mentioned fillers such as silica; phenolic or phosphorus-containing antioxidants; phenolic heat stabilizers; amine type antistatic agents; plasticizers such as polyolefin wax and phthalates; phenolic or phosphorus aging inhibitors; phenolic stabilizers against heat deterioration; hydroxyaromatic compounds such as hydroquinone, methoxyphenol, p-t-butylcatechol and 2,6-di-t-butyl-p-cresol, quinones such as benzoquinone and p-toluquinone, amines such as phenyl-α-naphthylamine, and other ultraviolet absorbers; stabilizers for improving storability, for example sulfur compounds such as 4,4'-thiobis(6-t-butyl-3-methylphenol) and 2,2'-thiobis(4-methyl-6-t-butylphenol); halogen-containing or phosphates or other organic fire retardants, and aluminum hydroxide, antimony oxide and other inorganic fire retardants, fire retardant auxiliaries; rubbers and other thermoplastic resins; thermosetting resins such as epoxy resins; fillers, and so forth.

The polymerizable resin in accordance with the first aspect of the present invention may be used in the form of a solution in an appropriate solvent. The solvent is not particularly restricted but may be any one capable of dissolving said polymerizable resin. As examples, there may be mentioned toluene, xylene, ethylbenzene, trimethylbenzene, chlorobenzene, decalin, cyclohexane, tetralin, methylcyclohexane and diethylene glycol dimethyl ether, among others.

The polymerizable resin in accordance with the first aspect of the present invention may also be used in various forms such as films, beads and pellets. Films are formed, for example by diluting said polymerizable resin with a solvent, applying the dilution to a medium and removing the solvent by drying. When the polymerizable resin in the form of beads is desired, the technique of suspension polymerization or emulsion polymerization, for instance, which are well known in the art, can be applied on the occasion of synthesizing the above polymerizable resin. When pellet forms are desired, they can be obtained, for example by melting said polymerizable resin by heating, pouring the melt into a mold and cooling the resin in the mold.

The second aspect of the present invention provides a method of producing the above polymerizable resin which comprises copolymerizing the monomer (1) represented by the general formula (1) given hereinabove with one or more monomers selected from the monomers (2) to (6) respectively represented by the general formulas (2) to (6) given hereinabove in a proportion such that the weight ratio of the monomer (1)/[sum total of the monomers (2) to (6)] amounts to 5/95 to 95/5.

The method of polymerization to be employed in producing the above polymerizable resin is not particularly restricted but required that the above monomers be copolymerized in the above proportion. The polymerizable resin can be produced with ease, for example by employing the ordinary radical polymerization technique.

The third aspect of the present invention provides a polymerizable resin which comprises one resin or a mixture of two or more resins selected from the group consisting of a cyclic olefin resin ($A_0$), a polyphenylene ether resin ($B_0$), a polyolefin resin ($C_0$) and resins prepared from said cyclic olefin resin ($A_0$) polyphenylene ether resin ($B_0$) and polyolefin resin ($C_0$) by substitution of at least one hydrogen atom of a methyl, methylene or methine group therein with an organic group represented by the general formula (7) given below and having a number average molecular weight of 2000 to 1000000 [to the exclusion of one resin or a mixture of two or more resins selected from the group consisting of said cyclic olefin resin ($A_0$) polyphenylene ether resin ($B_0$) and polyolefin resin ($C_0$)].

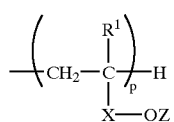

(7)

In the above general formula, $R^1$ represents a hydrogen atom or a methyl group. X represents $COOR^2$ or $OR^2$ and $R^2$ represents an alkylene group containing 1 to 6 carbon atoms, which may optionally be substituted with a hydroxyl group or a halogen atom. Z represents an alkenyl group containing 2 to 5 carbon atoms and p is an integer not smaller than 1.

As said cyclic olefin resin ($A_0$), there may be mentioned, for example, homopolymers of a norbornene type monomer, random addition type copolymers of a norbornene type monomer and an α-olefin or some other copolymerizable monomer, and hydrogenation products derived from said polymers or copolymers (hereinafter referred to as (co) polymers).

As the cyclic olefin monomer to be used for the production of the above cyclic olefin resin ($A_0$), there may be mentioned, for example, those norbornene type monomers which are disclosed in Japanese Kokai Publication Hei-3-14882, Japanese Kokai Publication Hei-3-122137, Japanese Kokai Publication Hei-2-227424 and Japanese Kokai Publication Hei-2-276842, for instance.

As said norbornene type monomer, there may be mentioned, for example, norbornene, dicyclopentadiene, dimethanooctahydronaphthalene, dimethanocyclopentadienonaphthalene, the trimer or tetramer of cyclopentadiene, adducts from cyclopentadiene and tetrahydroindene or the like; alkyl-, alkylidene- or aromatic-substituted derivatives of these norbornene type compounds; and derivatives of substituted or unsubstituted norbornene type compounds as derived by substitution with a polar group such as a halogen or a hydroxyl, ester, alkoxy, cyano, amide, imide or silyl group.

As specific examples of such norbornene type monomer, there may be mentioned, among others, 2-norbornene, 5-methyl-2-norbornene, 5,5-dimethyl-2-norbornene, 5-ethyl-2-norbornene, 5-ethylidene-2-norbornene, 5-methoxycarbonyl-2-norbornene, 5-cyano-2-norbornene, 5-methyl-5-methoxycarbonyl-2-norbornene, 5-phenyl-2-norbornene, 5-phenyl-5-methyl-2-norbornene; dicyclopentadiene, 2,3-dihydrodicyclopentadiene; 6-methyl-1,4:5,8-dimethano-1,4,4a,5,6,7,8,8a-octahydronaphthalene, 6-ethyl-1,4:5,8-dimethano-1,4,4a,5,6,7,8,8a-octahydronaphthalene, 2,3-cyclopentadienonaphthalene, 6-ethylidene-1,4:5,8-dimethano-1,4,4a,5,6,7,8,8a-octahydronaphthalene, 6-chloro-1,4:5,8-dimethano-1,4,4a,5,6,7,8,8a-octahydronaphthalene, 6-cyano-1,4:5,8-dimethano-1,4,4a,5,6,7,8,8a-octahydronaphthalene, 6-pyridyl-1,4:5,8-dimethano-1,4,4a,5,6,7,8,8a-octahydronaphthalene, 6-methoxycarbonyl-1,4:5,8-dimethano-1,4,4a,5,6,7,8,8a-octahydronaphthalene; 1,4:5,8-dimethano-1,2,3,4,4a,5,8,8a-octahydro-2,3-cyclopentadienonaphthalene, 1,4:5,10:6,9-trimethano-1,2,3,4,4a,5,5a,6,9,9a,10,10a-dodecahydro-2,3-cyclopentadienoanthracene; 1,4-methano-1,4,4a,4b,5,8,8a,9a-octahydrofluorene and 5,8-methano-1,2,3,4,4a,5,8,8a-octahydro-2,3-cyclopentadienonaphthalene. These norbornene type monomers may be used singly or two or more of them may be used in combination.

Among these, dimethanooctahydronaphthalenes such as 6-methyl-1,4:5,8-dimethano-1,4,4a,5,6,7,8,8a-octahydronaphthalene (MTD), dicyclopentadiene (DCP) and 5-ethylidene-2-norbornene (ENB) and combinations of two or more of these are preferred.

As the unsaturated monomer copolymerizable with the above norbornene type monomer, there may be mentioned, for example, α-olefins such as ethylene, propylene, 1-butene, 3-methyl-1-butene, 1-pentene, 3-methyl-1-pentene, 4-methyl-1-pentene, 1-hexene, 1-octene, 1-decene, 1-dodecene, 1-tetradecene, 1-hexadecene and 1-icosene; alicyclic olefins such as cyclopentene, cyclohexene, 3,4-dimethylcyclopentene, 3-methylcyclohexene and 2-(2-methylbutyl)-1-cyclohexene; vinyl aromatic compounds such as styrene and α-methylstyrene; non-norbornene type alicyclic olefins such as 3a,5,6,7a-tetrahydro-4,7-methano-1H-indene; unconjugated dienes such as 1,4-hexadiene, 1,6-octadiene, 2-methyl-1,5-hexadiene, 6-methyl-1,5-heptadiene, 7-methyl-1,6-octadiene, cyclohexadiene, dicyclopentadiene, methyltetrahydroindene, divinyl benzene, 1,5-hexadiene and norbornadiene; and trienes such as 2-propenyl-2,5-norbornadiene, 1,3,5-octatriene and 1,4,9-decatriene.

In producing addition copolymers of a norbornene type monomer and an unconjugated diene or addition copolymers of a norbornene type monomer and an unconjugated diene and another unsaturated monomer, a norbornene type unconjugated diene may be used in lieu of such an unconjugated diene as mentioned above.

As such norbornene type unconjugated diene, there may be mentioned, for example, 5-vinylnorbornene, 5-ethylidene-2-norbornene (ENB), 5-methylene-2-norbornene, 5-isopropylidene-2-norbornene and 6-chloromethyl-5-isopropenyl-2-norbornene. Therefore, the addition copolymers mentioned above include MTD/ENB/ethylene copolymers and the like, for instance.

Among the above cyclic olefin resins ($A_0$), cyclic olefin resins obtained by homopolymerizing or copolymerizing one or more monomers selected from the group consisting of 6-methyl-1,4:5,8-dimethano-1,4,4a,5,6,7,8,8a-octahydronaphthalene, dicyclopentadiene and 5-ethylidene-2-norbornene or cyclic olefin resins obtained by copolymerizing said monomers with other monomers copolymerizable therewith are more preferred.

In copolymerizing a norbornene type monomer and an unsaturated monomer copolymerizable therewith, the amount of said unsaturated monomer can be decided according to the unsaturated monomer species employed and the physical properties of the product copolymers, among others. In cases where ethylene, for instance, is used as an unsaturated monomer, the amount of ethylene is preferably not more than 80 mole percent, more preferably not more than 70 mole percent, still more preferably not more than 60 mole percent. When an unsaturated monomer other than ethylene is used for copolymerization for the purpose of molecular weight adjustment or resin modification, this unsaturated monomer is preferably used in an amount of not more than 30 mole percent, more preferably not more than 20 mole percent, still more preferably not more than 10 mole percent.

These cyclic olefin resins ($A_0$) can be produced by the known polymerization methods. As such methods, there may be mentioned, among others, the addition polymerization method and ring opening polymerization method utilizing the endocyclic double bond of the norbornene type monomer.

In the following, the cyclic olefin resins to be used in the practice of the present invention are classified into ($A_0$-1), ($A_0$-2) and ($A_0$-3) and described in further detail.

① ($A_0$-1)

Cyclic olefin resins produced by hydrogenating ring opening (co)polymers of a norbornene type monomer.

② ($A_0$-2)

Cyclic olefin resins comprising an addition copolymer of a norbornene type monomer and ethylene or another α-olefin, or cyclic olefin resins derived from said copolymers by hydrogenation.

③ ($A_0$-3)

Cyclic olefin resins comprising an addition (co)polymer of a norbornene type monomer(s), or cyclic olefin resins derived from said addition (co)polymers by hydrogenation.

The above thermoplastic cyclic olefin resins ($A_0$-1) to ($A_0$-3) can be produced by the methods mentioned below.

① Method of Producing ($A_0$-1)

A ring opening (co)polymer is produced by carrying out the per se known ring opening (co)polymerization using at least one norbornene type monomer in the presence of a catalyst comprising a titanium or tungsten compound. Then, thermoplastic cyclic olefin resins ($A_0$-1) are produced by reacting the carbon-carbon double bond sites in the above ring opening (co)polymer with hydrogen by the conventional method of hydrogenation.

② Method of Producing ($A_0$-2)

Using at least one norbornene type monomer and an unsaturated monomer such as ethylene or α-olefin, a copolymer is produced by carrying out the per se known addition copolymerization in the presence of a transition metal compound (e.g. titanium compound)/aluminum compound catalyst, if necessary followed by hydrogenation of said copolymer, to give a thermoplastic cyclic olefin resin ($A_0$-2)

③ Method of Producing ($A_0$-3)

Using at least one norbornene type monomer, an addition (co)polymer is produced by carrying out the per se known addition (co)polymerization in the presence of a transition metal compound (e.g. titanium compound)/aluminum compound catalyst or a palladium catalyst, if necessary followed by hydrogenation of said (co)polymer, to give a thermoplastic cyclic olefin resin ($A_0$-3)

When carbon-carbon double bonds occur in the above cyclic olefin resins ($A_0$-1) to ($A_0$-3), they can be rendered saturated by hydrogenation, as mentioned above. From the viewpoint of heat resistance and light degradability resistance, the hydrogenation percentage in these cyclic olefin resins is preferably not less than 90%, more preferably not less than 95%, still more preferably not less than 99%.

In accordance with the third aspect of the present invention, a polymerizable resin (hereinafter referred to as polymerizable resin ($A_1$)) prepared by substitution of at least one hydrogen atom of a methyl, methylene or methine group in the cyclic olefin resin ($A_0$) with an alkenyl ether group-containing organic group represented by general formula (7) given below and having a number average molecular weight of 2000 to 1000000 can be used.

The above polymerizable resin ($A_1$) can be produced by introducing an alkenyl ether group into a cyclic olefin resin ($A_0$) by a modification reaction. Specifically, it can be produced by reacting a cyclic olefin resin ($A_0$) with an alkenyl ether group-containing unsaturated monomer in the manner of grafting reaction.

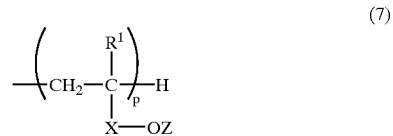

(7)

In the above general formula, $R^1$ represents a hydrogen atom or a methyl group. X represents $COOR^2$ or $OR^2$ and $R^2$ represents an alkylene group containing 1 to 6 carbon atoms and may optionally be substituted with a hydroxyl group or a halogen atom. Z represents an alkenyl group containing 2 to 5 carbon atoms. p is an integer not less than 1. With the increase of the number p, polymerizable functional groups occur in specific sites of the resin in accordingly large numbers.

As the alkenyl group represented by Z in the polymerizable resin ($A_1$), there may be mentioned the same ones as mentioned in relation to the monomer (1) in the first aspect of the invention.

The polymerizable resin ($A_1$) according to the present invention is a resin having the alkenyl ether group represented by ZO in the general formula (7) on a side chain or at a terminal site and generally has a number average molecular weight [analytical value obtained by gel permeation chromatography (GPC) using cyclohexane as the solvent] of 2000 to 1000000, preferably 8,000 to 100,000.

The content of the above alkenyl ether group [(weight of oxygen atoms in alkenyl ether groups contained in polymerizable resin ($A_1$)/weight of polymerizable resin ($A_1$))×100; % by weight] is preferably 0.05 to 5% by weight, more preferably 0.1 to 3% by weight. From the viewpoint of polymerizable functional group reactivity, propenyl is preferred as the alkenyl group constituting the alkenyl ether group.

In the following, the above polymerizable resin ($A_1$) and a method of producing the same are described in further detail.

The polymerizable resin ($A_1$) of the present invention can be obtained by reacting the above thermoplastic cyclic olefin resin ($A_0$) with an alkenyl ether group-containing unsaturated monomer in the manner of grafting.

As the alkenyl ether group-containing unsaturated monomer to be subjected to graft reaction, there may be mentioned the same ones as the monomers (I) employed in the first aspect of the present invention.

As the method of effecting the graft reaction, there may be mentioned, among others, the method comprising reacting a cyclic olefin resin ($A_0$) with the monomer (1) in solution (solution method) and the method comprising reacting a cyclic olefin resin ($A_0$) with the monomer (1) by melt mixing or melt kneading in the presence of a radical generator such as a peroxide (melt mixing method). The temperature for carrying out said graft reaction is preferably 100 to 390° C. Between the two methods mentioned above, the melt mixing method is preferred since it can be carried out in a simple and easy manner and an extruder or the like can be used. The content of the alkenyl ether group is preferably 0.05 to 5% by weight, more preferably 0.1 to 3% by weight.

The above cyclic olefin resin ($A_1$) may contain, in addition to said alkenyl ether group, functional groups such as hydroxyl, ester, organosilyl and carboxyl groups. Like in the case of the polymerizable resin in accordance with the first aspect of the present invention, additives such as antioxidants and heat stabilizers may be added to said polymerizable resin ($A_1$) when desirable.

The polyphenylene ether resin ($B_0$) to be used in the third aspect of the present invention is represented by the following general formula (8):

(8)

In the above general formula, q is an integer of 1 to 6, and J represents a polyphenylene ether chain substantially comprising a unit represented by the general formula (9) given below. When q is 1, Q represents a hydrogen atom and when q is 2 to 6, Q represents a compound having q of phenoxy groups having substituents inert to polymerization in ortho and para positions.

As typical examples of the compound having q of phenoxy groups having substituents inert to polymerization in ortho and para positions, there may be mentioned compounds represented by one of the following general formulas (10) to (13):

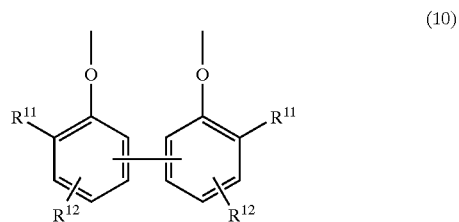
(10)

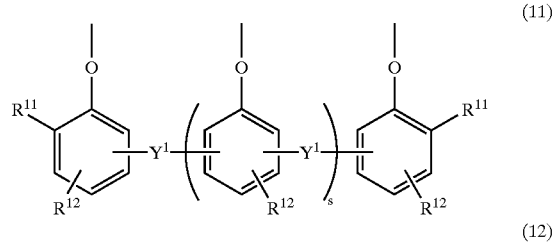
(11)

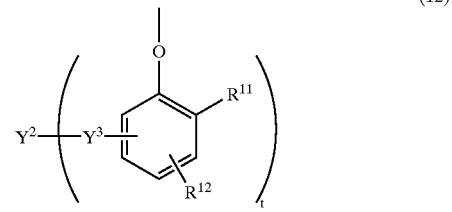
(12)

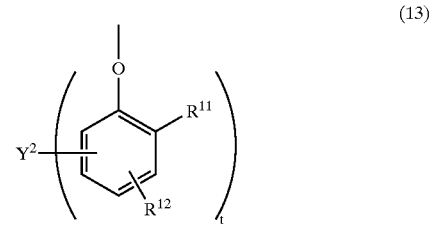
(13)

In the above formulas, $R^{11}$ and $R^{12}$ are the same or different and each represents a straight alkyl group containing 1 to 4 carbon atoms, $Y^1$ represents an aliphatic hydrocarbon group, a substituted derivative thereof, an aromatic hydrocarbon group, a substituted derivative thereof, an oxygen or sulfur atom or a sulfonyl or carbonyl group, $Y^2$ represents an aliphatic hydrocarbon group, a substituted derivative thereof, an aromatic hydrocarbon group or a substituted derivative thereof, and $Y^3$ represents an oxygen or sulfur atom or a sulfonyl or carbonyl group. The two $R^{12}$ groups in the general formula (10), $R^{12}$ and $Y^1$ in the general formula (11), $R^{12}$ and $Y^3$ in the general formula (12) and $R^{12}$ and $Y^2$ in the general formula (13) are all bound to the respective phenoxy groups at the ortho or para position thereof. s is an integer of 0 to 4 and t is an integer of 2 to 6.

As specific examples of the compounds represented by the above general formulas (10) to (13), there may be mentioned those represented by the following chemical formulas (14) to (18):

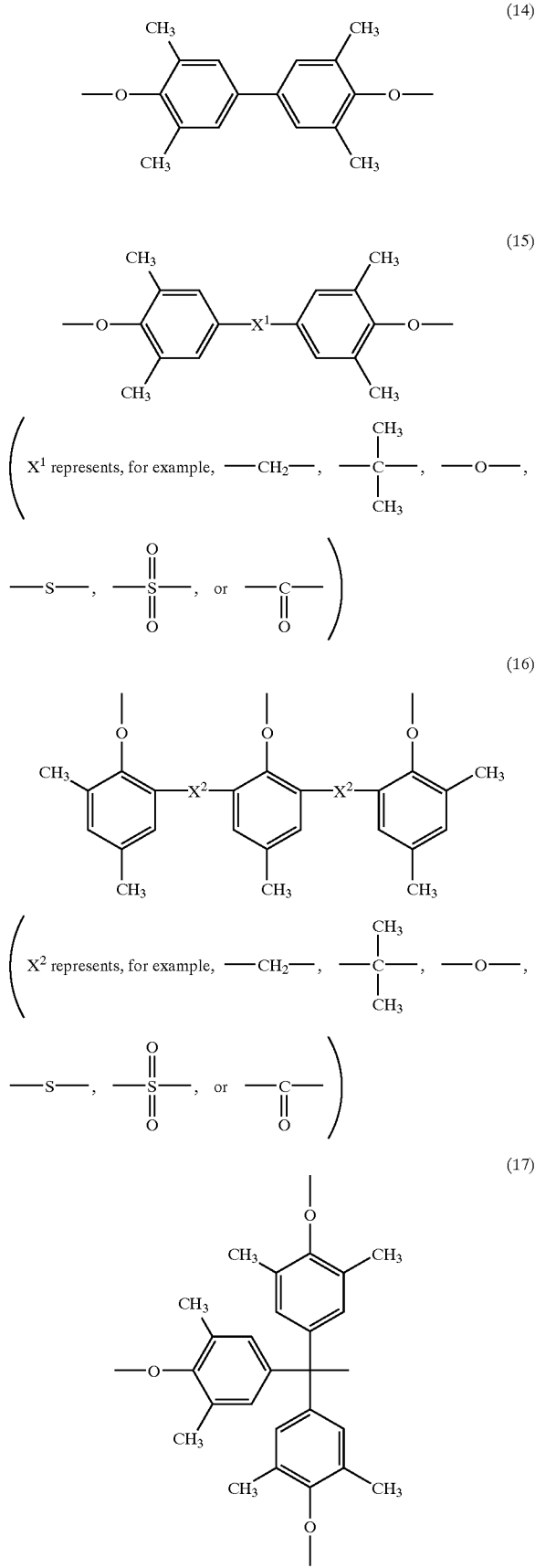

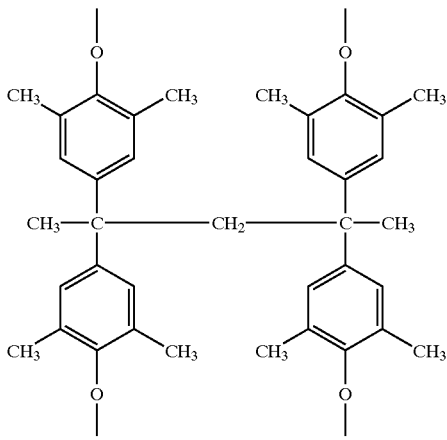

In the above general formula (8), J is a polyphenylene ether chain substantially comprising a unit represented by the following general formula (9);

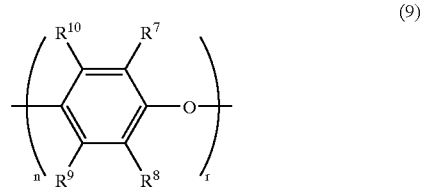

In the above general formula (9), $R^7$, $R^8$, $R^9$ and $R^{10}$ each independently represents a hydrogen atom, a lower alkyl group, an aryl group, a haloalkyl group or a halogen atom.

As said lower alkyl group, there can be mentioned, for example, methyl, ethyl, n-butyl and isobutyl. As said aryl group, there can be mentioned, for example, phenyl. As said haloalkyl group, there can be mentioned, for example, bromomethyl and chloromethyl. As said halogen atom, there can be mentioned, for example, bromine or chlorine. r is an integer not less than 1.

As preferred examples of the polyphenylene ether resin ($B_0$) represented by the above general formula (8), there may be mentioned, among others, poly(2,6-dimethyl-1,4-phenylene ether) obtained by homopolymerization of 2,6-dimethyphenol, styrene graft polymers derived from poly (2,6-dimethyl-1,4-phenylene ether), copolymers of 2,6-dimethylphenol and 2,3,6-trimethylphenol, and copolymers of 2,6-dimethylphenol and 2-methyl-6-phenylphenol.

As regards the molecular weight of said polyphenylene ether resin ($B_0$), it preferably has a molecular weight such that the viscosity number η sp/c measured for a 0.5 g/dl chloroform solution at 30° C. is within the range of 0.1 to 1.0.

In accordance with the third aspect of the present invention, use can be made of a polymerizable resin (hereinafter, "polymerizable resin ($B_1$)") prepared by substitution of at least one hydrogen atom of a methyl, methylene or methine group in the polyphenylene ether resin ($B_0$) with an alkenyl ether group-containing organic group represented by the above general formula (7) and having a number average molecular weight of 2000 to 1000000.

The organic group represented by the general formula (7) has already been described in detail with respect to the polymerizable resin ($A_1$), hence the repeated description is omitted here.

The above polymerizable resin ($B_1$) can be produced by introducing the alkenyl ether group into the polyphenylene ether resin ($B_0$) by a modification reaction. More specifically, it can be produced, for example, by the graft reaction of an alkenyl ether group-containing unsaturated monomer with the polyphenylene ether resin ($B_0$)

Said graft reaction can be carried out in the same manner as in the case of the polymerizable resin ($A_1$).

The polymerizable resin ($B_1$) of the present invention is a resin having an alkenyl ether group on a side chain or at a terminal site and generally has a number average molecular weight (analytical value obtained by GPC with cyclohexane as the solvent) of 2000 to 1000000, preferably 8,000 to 100,000.

Like in the case of the polymerizable resin ($A_1$), the content of the alkenyl ether group is preferably 0.05 to 5% by weight, more preferably 0.1 to 3% by weight, on the basis of the weight of oxygen in the alkenyl ether group. From the viewpoint of polymerizable functional group reactivity, propenyl group is preferred as an alkenyl group constituting the alkenyl ether group.

The above polymerizable resin ($B_1$) may contain a hydroxyl, ester, organosilyl, carboxylic and/or like functional group in addition to the above alkenyl ether group. Like the polymerizable resin used in accordance with the first aspect of the invention, the polymerizable resin ($A_1$) may contain additives, such as antioxidants and heat stabilizers, if necessary. The polymerizable resin ($B_1$) can be produced in the same forms as the polymerizable resin to be produced in the first aspect of the invention.

The polyolefin resin ($C_0$) to be used in accordance with the third aspect of the invention is a resin produced in the conventional manner by polymerizing at least one monomer. It can be obtained, for example by subjecting at least one unsaturated monomer to addition (co)polymerization in the presence of a transition metal compound (e.g. titanium compound)/aluminum compound catalyst system or the like.

More specifically, the above polyolefin resin ($C_0$) can be obtained by homopolymerizing or copolymerizing one or more monomers selected from the group consisting of styrene, ethylene, propylene, butadiene and acrylonitrile.

Therefore, the above monomers are polymerized singly or two or more of them are polymerized combinedly. The method of polymerization is not particularly restricted but various known methods can be employed.

In accordance with the third aspect of the present invention, a polymerizable resin (hereinafter, "polymerizable resin ($C_1$)") can be used which is prepared by substitution of at least one hydrogen atom of a methyl, methylene or methine group in the polyolefin resin ($C_0$) with an alkenyl ether group-containing organic group represented by the general formula (7) and has a number average molecular weight of 2000 to 1000000.

The organic group represented by the above general formula (7) has already been described in detail with respect to the polymerizable resin ($A_1$), hence the repeated description is omitted here.

Like in the case of the polymerizable resin ($A_1$), the polymerizable resin ($C_1$) can be produced by introducing the alkenyl ether group into the polyolefin resin ($C_0$) by a modification reaction. The method 6f effecting the modification reaction is the same as in the case of the polymerizable resin ($A_1$).

The polymerizable resin ($C_1$) of the present invention is a resin having an alkenyl ether group on a side chain or at a terminal site and generally has a number average molecular weight (analytical value obtained by GPC with cyclohexane as the solvent) of 2000 to 1000000, preferably 8,000 to 100,000. Like in the case of the polymerizable resin ($A_1$), the content of the alkenyl ether group is preferably 0.05 to 5% by weight, more preferably 0.1 to 3% by weight, on the basis of the weight of oxygen in the alkenyl ether group. From the viewpoint of polymerizable functional group reactivity, propenyl group is preferred as an alkenyl group constituting the alkenyl ether group.

Said polymerizable resin ($B_1$) may contain a hydroxyl, ester, organosilyl, carboxylic and/or like functional group in addition to the above alkenyl ether group. Like the polymerizable resin used in accordance with the first aspect of the invention, the polymerizable resin ($A_1$) may contain additives, such as antioxidants and heat stabilizers, if necessary. The polymerizable resin ($B_1$) can be produced in the same forms as the polymerizable resin to be produced in the first aspect of the present invention.

In accordance with the third aspect of the present invention, any one of the polymerizable resins ($A_1$), ($B_1$) and ($C_1$) can be used either singly or two or more of the above polymerizable resins can be used combinedly as a mixture.

Furthermore, one or two or more of the cyclic olefin resin ($A_0$) polyphenylene ether resin ($B_0$) and polyolefin resin ($C_0$) may be incorporated in one resin or a resin mixture of two or more resins selected from the above polymerizable resins ($A_1$), ($B_1$) and ($C_1$) in amounts in which the heat resistance will not be sacrificed.

In the third aspect of the present invention, the use of one resin or a resin mixture of two or more resins selected from the cyclic olefin resin ($A_0$), polyphenylene ether resin ($B_0$) and polyolefin resin ($C_0$) is excluded, since it is considered that these three kinds of resins are already known.

Therefore, the polymerizable resin in accordance with the third aspect of the present invention does not include the cyclic olefin resin ($A_0$) alone, the polyphenylene ether resin ($B_0$) alone, the polyolefin resin ($C_0$) alone, a mixture of the cyclic olefin resin ($A_0$) and polyphenylene ether resin ($B_0$), a mixture of the polyphenylene ether resin ($B_0$) and polyolefin resin ($C_0$), a mixture of the cyclic olefin resin ($A_0$) and polyolefin resin ($C_0$), or a mixture of the cyclic olefin resin ($A_0$) polyphenylene ether resin ($B_0$) and polyolefin resin ($C_0$).

The fourth aspect of the present invention provides a method of curing the polymerizable resin according to the first aspect or the polymerizable resin according to the third aspect of the present invention which comprises subjecting said resin to cationic polymerization or radical polymerization. Hereinafter, said two resin species are collectively referred to as a polymerizable resin for short.

In curing the above polymerizable resin, the polymerizable resin or a solution thereof, if necessary after drying prebaking or the like, is subjected to curing by heating and/or light irradiation to thereby effect cationic polymerization or radical polymerization and provide the cured resin with heat resistance and solvent resistance.

Although the conditions of said curing by heating are not particularly restricted, the temperature is preferably 30° C. to 400° C., more preferably 100° C. to 350° C. and the time is preferably several seconds to one day, more preferably about 10 minutes to about 5 hours.

In the case of polymerization by light irradiation, the polymerization can be easily effected by ultraviolet or electron beam irradiation under ordinary conditions. The ultraviolet irradiation apparatus is not particularly restricted but mention may be made of a high pressure mercury lamp, low pressure mercury lamp, metal halide lamp, etc. The electron beam irradiation apparatus is not particularly restricted but there may be mentioned a scanning irradiation apparatus (available from Nisshin Electric Co.), curtain type irradiation apparatus (available from Iwasaki Electric Co.) and the like.

In accordance with the fourth aspect of the invention, a cationic polymerization initiator and/or radical polymerization initiator can be used, if necessary, in the step of curing. A thermal cationic polymerization initiator and/or photo cationic polymerization initiator can be used as the above cationic polymerization initiator, and a thermal radical polymerization initiator and/or photo radical polymerization initiator can be used as said radical polymerization initiator.

Said thermal cationic polymerization initiator is not particularly restricted but any known thermal cationic polymerization initiator, for example an onium salt polymerization initiator, can be used. As specific examples of said onium salt polymerization initiator, there may be mentioned, for example, sulfonium salts such as aryldialkylsulfonium hexafluoroantimonates, aryldialkylsulfonium hexafluorophosphates, diarylalkylsulfonium hexafluoroantimonates and aryldialkylsulfonium tetraperfluorophenyl borates, iodonium salts such as diaryliodonium hexafluoroantimonates, diaryliodonium hexafluorophosphates, diaryliodonium tetraperfluorophenyl borates, and so forth. These are readily available from commercial sources. Thus, mention may be made of San-aid SI series are commercially available from Sanshin Chemical Industry Co.

Said photo cationic polymerization initiator is not particularly restricted but any known photo cationic polymerization initiator can be used. As specific examples of said photo cationic polymerization initiator, there may be mentioned, among others, triphenylsulfonium hexafluoroantimonate, triphenylsulfonium phosphate, p-(phenylthio)phenyldiphenylsulfonium hexafluoroantimonate, p-(phenylthio)phenyldiphenylsulfonium hexafluorophosphate, 4-chlorophenyldiphenylsulfonium hexafluorophosphate, 4-chlorophenyldiphenylsulfonium hexafluoroantimonate, bis[4-(diphenylsulfonio)phenyl] sulfide bishexafluorophosphate, bis[4-(diphenylsulfonio)phenyl] sulfide bishexafluoroantimonate, (2,4-cyclopentadiene-1-yl)[(1-methylethyl)benzene]-Fe-hexafluorophosphate, and diallyliodonium hexafluoroantimonate. These are readily available from commercial sources. Thus, mention may be made of Asahi Denka's SP-150 and SP-170; Ciba Geigy's Irgacure 261; Union Carbide's UVI-6974 and UVI-6990; Sartomer's CD-1012 and so forth.

In the fourth aspect of the invention, an onium salt is preferably used as the above photo cationic polymerization initiator. The use of at least one of triarylsulfonium salts and diaryliodonium salts as said onium salt is preferred.

Usable as the thermal radical polymerization initiators and photo radical polymerization initiators are known ones. When, among these radical initiators, a thermal radical polymerization initiator is used, it is preferred from the storage stability viewpoint that its 10 hour half-life temperature be generally not lower than 80° C., preferably not lower than 120° C.

Specific examples of said thermal radical polymerization initiator are 1,1,3,3-tetramethylbutyl hydroperoxide, t-butyl peroxyacetate, t-butyl peroxybenzoate, dicumyl peroxide, t-butyl cumyl peroxide, 2,5-dimethyl-2,5-di (t-butylperoxy) hexyne-3 and cumene hydroperoxide, among others.

As specific examples of said photo radical polymerization initiator among the above radical polymerization initiators, there can be mentioned, for example, benzoin alkyl ethers, benzyl dimethyl ketal, 1-hydroxycyclohexyl phenyl ketone, 2-hydroxy-2-methyl-1-phenylpropan-1-one, benzophenone, methyl benzoyl formate and isopropylthioxanthone. These may be used singly or two or more of them may be used in admixture. Sensitizers may be used together with these photo radical initiators.

Said cationic polymerization initiator and/or radical polymerization initiator is added to the polymerizable resin or a solution thereof prior to curing thereof. The method of addition is not particularly restricted but mention may be made of the method comprising admixing the polymerizable resin in pellet or powder form with the initiator, the method comprising melt kneading the polymerizable resin and initiator, and the method comprising admixing a solution of the polymerizable resin with the initiator, for instance.

The weight ratio between the above polymerizable resin and the above cationic polymerization initiator and/or radical polymerization initiator is preferably 95:5 to 99.9:0.01. If the proportion of the initiator is less than 0.01, a sufficient initiation effect cannot be obtained. If it is in excess of 5, an additional improving effect on the rate of polymerization will not be produced, hence such use is uneconomical. A preferred range is 96:4 to 98:2.

In carrying out the curing of the above polymerizable resin, a sensitizer and the like may be added, if necessary. The above sensitizer is not particularly restricted but mention may be made of carbonyl compounds such as benzophenone, anthraquinone, 1,2-naphthoquinone, 1,4-naphthoquinone, benzanthrone, p,p'-tetramethyldiaminobenzophenone and chloranil, nitro compounds such as nitrobenzene, p-dinitrobenzene and 2-nitrofluorene, aromatic hydrocarbons such as anthracene and chrisene, sulfur compounds such as diphenyl disulfide, and nitrogen compounds such as nitroaniline, 2-chloro-4-nitroaniline, 5-nitro-2-aminotoluene and tetracyanoethylene, among others.

In accordance with the fourth aspect of the present invention, a cured resin having a lower dielectric constant can be obtained by subjecting a polymerizable resin (D)

having at least one alkenyl group containing 2 to 5 carbon atoms within the molecule and having a dielectric constant of not more than 3.0 to cationic polymerization or radical polymerization.

As said polymerizable resins (D), there may be mentioned the following resins (D-1) to (D-4), although other resins may also be used without any limitation.

① (D-1)

This includes the polymerizable resins according to the first aspect of the present invention, namely copolymers of the monomer (1) and one or more monomers selected from the monomers (2) to (6), which have a number average molecular weight of 2000 to 1000000, as mentioned hereinabove.

② (2 (D-2)

This includes the cyclic olefin resins ($A_1$) constituting the polymerizable resins according to the third aspect of the present invention.

③(D-3)

This includes the polyphenylene ether resins ($B_1$) constituting the polymerizable resins according to the third aspect of the present invention.

④ (D-4)

This includes the polyolefin resins ($C_1$) constituting the polymerizable resins according to the third aspect of the present invention.

Said polymerizable resin (D) can be obtained by cationic polymerization or radical polymerization in the same manner as mentioned hereinabove.

The cured resin obtained by the curing method according to the fourth aspect of the present invention, in particular the cured resin obtained by subjecting the above polymerizable resin (D) to cationic polymerization or radical polymerization, can judiciously be used as an insulator. The present invention, in its fifth aspect, is concerned with said cured resin and, in its six aspect, is concerned with said insulator.

Said insulator can be used, for example, as an over coating material or interlayer insulating material in electronic elements such as semiconductor devices, light emission diodes and various memories, hybrid ICs, MCMs (multichip modules), circuit board substrates and display parts.

Specifically, said insulator is used, for example, as an interlayer insulating film in multilayer circuit substrates of electronic circuit. Said interlayer insulating film may be single-layered or multilayered. Said insulating film preferably has a thickness of not more than 100 $\mu$m, more preferably not more than 50 $\mu$m.

In case of using as said over coating material or interlayer insulating material, a liquid containing the polymerizable resin, for example, is applied to the substrate surface by the spin coat method or the like and then rendered solid by drying or the like, if necessary followed by processing such as drilling. Thereafter, curing by light irradiation and/or heating is curried out under the conditions already mentioned hereinabove to provide the film with heat resistance and solvent resistance. Then, wiring or the like is made on the insulating layer. The subsequent repetition of the above procedure gives a multilayer insulator.

The insulating thin film obtained by the above method generally shows a water absorption of not more than 0.1%, an insulation resistance of $12^{15}$ to $10^{17}$ $\Omega \cdot$cm, a dielectric constant at 1 MHz of 2.2 to 3.0, and a dielectric loss tangent at 1 MHz of about 0.0001 to 0.01 and thus has a lower water absorption capacity and is better in insulating properties such as low dielectric constant as compared with epoxy resins and polyimide resins, which are insulating materials in conventional use. As regards the heat resistance, said film is comparable to the conventional insulating materials. A given pattern formed from the insulating thin film, when brought into contact with a solder at 300° C. for 1 minute, does not show any abnormality such as sagging, collapsing or blistering of the pattern. The film has good cracking resistance against various solvents and the adhesion thereof to inorganic materials or metals, for example silicon, is also good.

The insulator according to the sixth aspect of the present invention, which shows much reduced water absorption as compared with the conventional insulating materials, thus contributes to improvements in reliability of semiconductor devices and electronic parts. Furthermore, while polyimide resins are generally used much as thin film interlayer insulating materials and have high heat resistance, they generally show a dielectric constant of not less than 3.5 and a water absorption of not less than 1%. On the contrary, the thin interlayer insulating film formed from the insulating material of the present invention shows a dielectric constant of not more than 2.8 and a water absorption of not more than 0.1%, hence is highly advantageous to higher speed operation and higher density integration of electronic circuits.

The seventh aspect of the present invention is directed to electrical machinery or apparatus parts such as packages or like circuit substrates, liquid crystal display devices and the like on which the above insulating thin film is formed and to electrical machinery or apparatus, for example computers, in which these circuit substrates and/or display devices are built in.

BEST MODES FOR CARRYING OUT THE INVENTION

The following examples illustrate the present invention in further detail. They are, however, by no means limitative of the scope of the invention.

EXAMPLE 1

A 500-mL four-necked flask equipped with a stirrer and a temperature control device was charged with 100 g of toluene, and the temperature was adjusted to 80° C. with stirring under nitrogen. Then, 25 g of styrene, 89 g of propenoxyethyl methacrylate, 48 g of isobornyl methacrylate, 47 g of perfluoropropyl vinyl ether and 0.1 g of azobisisobutyronitrile were added dropwise over 240 minutes, followed by 60 minutes of maturation at 80° C. Then, the solution was cooled to room temperature and taken out of the flask, and the toluene was removed under reduced pressure in a reduced pressure drier at 70° C. and 10 mm Hg, whereby 190 g of a copolymer was obtained.

The introduction of the propenyl ether group was confirmed by checking this copolymer by $^1$H-NMR (in $^1$H-NMR, chemical shifts δ: 1.6, 6, δ: 4.4 and δ: 6.0). Molecular weight determination by GPC revealed a number average molecular weight of 250,000.

This reaction product (95.0 weight parts) and 5.0 weight parts of a photo cationic polymerization initiator (Union Carbide's "UVI-6990") were dissolved in 100 weight parts of toluene. This solution was then applied, by the spin coat technique, to a silicon wafer having an aluminum wiring formed on a 4,000-angstrom-thick $SiO_2$ film, the thin film formed was dried at 80° C. for 10 minutes, the temperature was then raised to 150° C. and the thin film was subjected to ultraviolet irradiation using a 80 W/cm high pressure mercury lamp under the following conditions that the distance was 10 cm, the radiation intensity was 160 mW/cm$^2$, and the time was 1 minute. Polymerization was further allowed to proceed at 150° C. for 3 hours, whereupon an over coat film with a film thickness of 3 μm was obtained.

<Measurements of Dielectric Constant, Dielectric Loss Tangent and Insulation Resistance>

Polymerization was carried out using the resin composition solution obtained in the above example and samples were prepared according to JIS K 6911 and measured for electrical properties (dielectric constant, dielectric loss tangent and insulation resistance). The results are shown below in Table 1.

EXAMPLE 2

The same four-necked flask as used in Example 1 was charged with 100 g of toluene, and the temperature was adjusted to 80° C. with stirring under nitrogen. Then, 32 g of styrene, 114 g of propenoxyethyl methacrylate, 62 g of isobornyl methacrylate and 0.1 g of azobisisobutyronitrile were added dropwise over 240 minutes, followed by 60 minutes of maturation at 80° C. Then, the solution was cooled to room temperature and taken out of the flask, and the toluene was removed under reduced pressure in a reduced pressure drier at 70° C. and a vacuum of 10 mm Hg, whereupon 190 g of a copolymer was obtained.

The introduction of the propenyl ether group was confirmed by checking this copolymer by $^1$H-NMR. Molecular weight determination by GPC revealed a number average molecular weight of 260,000.

This reaction product (95.0 weight parts) and 5.0 weight parts of a photo cationic polymerization initiator (Union Carbide's "UVI-6990") were dissolved in 100 weight parts of toluene. This solution was then subjected to polymerization in the same manner as in Example 1, whereupon an over coat film was obtained.

The over coat film obtained was evaluated in the same manner as in Example 1. The results are shown below in Table 1.

EXAMPLE 3

The same four-necked flask as used in Example 1 was charged with 100 g of toluene, and the temperature was adjusted to 80° C. with stirring under nitrogen. Then, 50 g of perfluoropropyl vinyl ether, 89 g of propenoxyethyl methacrylate, 65 g of perfluoroethyl methacrylate and 0.1 g of azobisisobutyronitrile were added dropwise over 240 minutes, followed by 60 minutes of maturation at 80° C. Then, the solution was cooled to room temperature and taken out of the flask, and the toluene was removed under reduced pressure in a reduced pressure drier at 70° C. and a vacuum of 10 mm Hg, whereupon 190 g of a copolymer was obtained.

The introduction of the propenyl ether group was confirmed by checking this copolymer by $^1$H-NMR. Molecular weight determination by GPC revealed a number average molecular weight of 260,000.

This reaction product (95.0 weight parts) and 5.0 weight parts of a photo cationic polymerization initiator (Union Carbide's "UVI-6990") were dissolved in 100 weight parts of toluene. This solution was then subjected to polymerization in the same manner as in Example 1, whereupon an over coat film was obtained.

The over coat film obtained was evaluated in the same manner as in Example 1. The results are shown below in Table 1.

EXAMPLE 4

The same four-necked flask as used in Example 1 was charged with 100 g of toluene, and the temperature was adjusted to 80° C. with stirring under nitrogen. Then, 50 g of perfluoropropyl vinyl ether, 89 g of propenoxyethyl methacrylate, 65 g of isobornyl methacrylate and 0.1 g of azobisisobutyronitrile were added dropwise over 240 minutes, followed by 60 minutes of maturation at 80° C. Then, the solution was cooled to room temperature and taken out of the flask, and the toluene was removed under reduced pressure in a reduced pressure drier at 70° C. and a vacuum of 10 mm Hg, whereupon 190 g of a copolymer was obtained.

The introduction of the propenyl ether group was confirmed by checking this copolymer by $^1$H-NMR. Molecular weight determination by GPC revealed a number average molecular weight of 250,000.

This reaction product (95.0 weight parts) and 5.0 weight parts of a photo cationic polymerization initiator (Union Carbide's "UVI-6990") were dissolved in 100 weight parts of toluene. This solution was then subjected to polymerization in the same manner as in Example 1, whereupon an over coat film was obtained.

The over coat film obtained was evaluated in the same manner as in Example 1. The results are shown below in Table 1.

EXAMPLE 5

6-Methyl-1,4:5,8-dimethano-1,4,4a,5,6,7,8,8a-octahydronaphthalene (MTD) was subjected to ring opening polymerization by known methods and the ring opening polymer obtained was hydrogenated to give a cyclic olefin resin [hydrogenation rate; nearly 100%, number average molecular weight; about 28,000 (as polystyrene equivalent)].

Then, 100 weight parts of the above cyclic olefin resin was dry-blended at room temperature with 20 weight parts of propenoxyethyl methacrylate and 7.0 weight parts of 2,5-dimethyl-2,5-di(t-butylperoxy)hexane (NIPPON OIL AND FAT, "Perhexa 25B") and the blend was extruded from a twin-screw extruder at a cylinder temperature of 260° C. and a screw revolution rate of 230 rpm.

The introduction of propenyl ether group was confirmed by checking this reaction product by $^1$H-NMR. Then, 95.0 weight parts of this reaction product and 5.0 weight parts of a photo cationic polymerization initiator (Union Carbide's "UVI-6990") were dissolved in 100 weight parts of toluene, and this solution was subjected to polymerization in the same manner as in Example 1, whereupon an over coat film was obtained.

The over coat film obtained was evaluated in the same manner as in Example 1. The results are shown below in Table 1.

EXAMPLE 6

Dry-blending 100 weight parts of poly(2,6-dimethyl-1,4-phenylene ether) having a viscosity number ($\eta$ sp/c) of 0.54 as measured in a 0.5 g/dl chloroform solution at 30° C., 1.5 weight parts of propenoxyethyl methacrylate and 1.0 weight part of 2,5-dimethyl-2,5-di(t-butylperoxy)hexane (NIPON OIL AND FAT, "Perhexa 25B") together at room temperature, the blend was extruded from a twin-screw extruder at a cylinder temperature of 300° C. and a screw revolution rate of 230 rpm.

The introduction of propenyl ether group was confirmed by checking this reaction product by $^1$H-NMR. Then, 95.0 weight parts of this reaction product and 5.0 weight parts of a photo cationic polymerization initiator (Union Carbide's "UVI-6990") were dissolved in 100 weight parts of toluene, and this solution was subjected to polymerization in the same manner as in Example 1, whereupon an over coat film was obtained.

The over coat film obtained was evaluated in the same manner as in Example 1. The results are shown below in Table 1.

EXAMPLE 7

Dry-blending 100 weight parts of a polystyrene resin [number average molecular weight; about 28,000] obtained by the conventional method, 20 weight parts of propenoxyethyl methacrylate and 7.0 weight parts of 2,5-dimethyl-2, 5-di (tert-butylperoxy)hexane (NIPPON OIL AND FAT, "Perhexa 25B") together at room temperature, the blend was extruded from a twin-screw extruder at a cylinder temperature of 26° C. and a screw revolution rate of 230 rpm.

The introduction of propenyl ether group was confirmed by checking this reaction product by $^1$H-NMR. Then, 95.0 weight parts of this reaction product and 5.0 weight parts of a photo cationic polymerization initiator (Union Carbide's "UVI-6990") were dissolved in 100 weight parts of toluene, and this solution was subjected to polymerization in the same manner as in Example 1, whereupon an over coat film was obtained.

The over coat film obtained was evaluated in the same manner as in Example 1. The results are shown below in Table 1.

EXAMPLE 8

Following the procedure of Example 1, 190 g of a styrene/propenoxyethyl methacrylate/isobornyl methacrylate/perfluoropropyl vinyl ether copolymer was prepared.

This copolymer (95.0 weight parts) and 5.0 weight parts of a radical polymerization initiator (1,1,3,3-tetramethylbutyl hydroperoxide) were dissolved in 100 weight parts of toluene. This solution was then applied, by the spin coat technique, to a silicon wafer having an aluminum wiring formed on a 4,000-angstrom-thick SiO$_2$ film, the thin film formed was dried at 80° C. for 10 minutes and then heated at 180° C. for 300 minutes to allow the polymerization to proceed, whereupon a 3-$\mu$m-thick over coat film was obtained.

The over coat film obtained was evaluated in the same manner as in Example 1. The results are shown below in Table 1.

EXAMPLE 9

Following the procedure of Example 2, 190 g of a styrene/propenoxyethyl methacrylate/isobornyl methacrylate copolymer was prepared. This copolymer (95.0 weight parts) and 5.0 weight parts of a radical polymerization initiator (1,1,3,3-tetramethylbutyl hydroperoxide) were dissolved in 100 weight parts of toluene. This solution was then subjected to polymerization in the same manner as in Example 7 to give an over coat film.

The over coat film obtained was evaluated in the same manner as in Example 1. The results are shown below in Table 1.

EXAMPLE 10

Following the procedure of Example 2, 190 g of a perfluoropropyl vinyl ether/propenoxyethyl methacrylate/perfluoroethyl methacrylate copolymer was prepared. This copolymer (95.0 weight parts) and 5.0 weight parts of a radical polymerization initiator (1,1,3,3-tetramethylbutyl hydroperoxide) were dissolved in 100 weight parts of toluene. This solution was then subjected to polymerization in the same manner as in Example 7 to give an over coat film.

The over coat film obtained was evaluated in the same manner as in Example 1. The results are shown below in Table 1.

EXAMPLE 11

Following the procedure of Example 3, 190 g of a perfluoropropyl vinyl ether/propenoxyethyl methacrylate/isobornyl methacrylate copolymer was prepared. This copolymer (95.0 weight parts) and 5.0 weight parts of a radical polymerization initiator (1,1,3,3-tetramethylbutyl hydroperoxide) were dissolved in 100 weight parts of toluene. This solution was then subjected to polymerization in the same manner as in Example 7 to give an over coat film.

The over coat film obtained was evaluated in the same manner as in Example 1. The results are shown below in Table 1.

EXAMPLE 12

Following the procedure of Example 4, the reaction product from the cyclic olefin resin and propenoxyethyl methacrylate was obtained. This reaction product (95.0 weight parts) and 5.0 weight parts of a radical polymerization initiator (1,1,3,3-tetramethylbutyl hydroperoxide) were dissolved in 100 weight parts of toluene. This solution was then subjected to polymerization in the same manner as in Example 7 to give an over coat film.

The over coat film obtained was evaluated in the same manner as in Example 1. The results are shown below in Table 1.

EXAMPLE 13

Following the procedure of Example 5, the reaction product from poly(2,6-dimethyl-1,4-phenylene ether) and propenoxyethyl methacrylate was obtained. This reaction product (95.0 weight parts) and 5.0 weight parts of a radical polymerization initiator (1,1,3,3-tetramethylbutyl-hydroperoxide) were dissolved in 100 weight parts of toluene. This solution was then subjected to polymerization in the same manner as in Example 7 to give an over coat film.

The over coat film obtained was evaluated in the same manner as in Example 1. The results are shown below in Table 1.

EXAMPLE 14

Following the procedure of Example 6, the reaction product from the polystyrene resin and propenoxyethyl methacrylate was obtained. This reaction product (95.0 weight parts) and 5.0 weight parts of a radical polymerization initiator (1,1,3,3-tetramethylbutyl hydroperoxide) were dissolved in 100 weight parts of toluene. This solution was then subjected to polymerization in the same manner as in Example 7 to give an over coat film.

The over coat film obtained was evaluated in the same manner as in Example 1. The results are shown below in Table 1.

COMPARATIVE EXAMPLE 1

The same four-necked flask as used in Example 1 was charged with 100 g of toluene, and the temperature was adjusted to 80° C. with stirring under nitrogen. Then, 120 g of styrene, 89 g of glycidyl methacrylate and 0.1 g of azobisisobutyronitrile were added thereto and the reaction carried out in the same manner as in Example 1 to give a styrene-glycidyl methacrylate copolymer. This copolymer (96 weight parts) and 4 weight parts of 4,4'-bisazidobenzal (4-methyl)cyclohexanone were dissolved in 100 weight parts of xylene and the solution was subjected to polymerization in the same manner as in Example 1, whereupon an over coat film was obtained.

The over coat film obtained was evaluated in the same manner as in Example 1. The results are shown below in Table 1.

COMPARATIVE EXAMPLE 2

Using glycidyl methacrylate in lieu of propenoxyethyl methacrylate, the reaction of Example 4 was carried out in the same manner to give a glycidyl-modified cyclic polyolefin resin. Then, 96 weight parts of this modified resin and 4 weight parts of 4,4'-bisazidobenzal(4-methyl) cyclohexanone were dissolved in 100 weight parts of xylene and the solution was subjected to polymerization in the same manner as in Example 1, whereupon an over coat film was obtained.

The over coat film obtained was evaluated in the same manner as in Example 1. The results are shown below in Table 1.

COMPARATIVE EXAMPLE 3

Using glycidyl methacrylate in lieu of propenoxyethyl methacrylate, the reaction of Example 5 was carried out in the same manner to give a glycidyl-modified polyphenylene ether resin. Then, 96 weight parts of this modified resin and 4 weight parts of 4,4'-bisazidobenzal(4-methyl) cyclohexanone were dissolved in 100 weight parts of xylene and the solution was subjected to polymerization in the same manner as in Example 1, whereupon an over coat film was obtained.

The over coat film obtained was evaluated in the same manner as in Example 1. The results are shown below in Table 1.

COMPARATIVE EXAMPLE 4

Using glycidyl methacrylate in lieu of propenoxyethyl methacrylate, the reaction of Example 6 was carried out in the same manner to give a glycidyl-modified polystyrene resin. Then, 96 weight parts of this modified resin and 4 weight parts of 4,4'-bisazidobenzal(4-methyl) cyclohexanone were dissolved in 100 weight parts of xylene and the solution was subjected to polymerization in the same manner as in Example 1, whereupon an over coat film was obtained.

The over coat film obtained was evaluated in the same manner as in Example 1. The results are shown below in Table 1.

TABLE 1

|  | Dielectric constant | Dielectric loss tangent | Insulation resistance ($\Omega \cdot cm$) |
|---|---|---|---|
| Example 1 | 2.4 | 0.0006 | $6 \times 10^{16}$ |
| Example 2 | 2.4 | 0.0005 | $6 \times 10^{16}$ |
| Example 3 | 2.2 | 0.0004 | $3 \times 10^{16}$ |
| Example 4 | 2.3 | 0.0005 | $4 \times 10^{16}$ |
| Example 5 | 2.4 | 0.0007 | $7 \times 10^{16}$ |
| Example 6 | 2.7 | 0.0009 | $5 \times 10^{17}$ |
| Example 7 | 2.6 | 0.0008 | $8 \times 10^{16}$ |
| Example 8 | 2.4 | 0.0006 | $6 \times 10^{16}$ |
| Example 9 | 2.4 | 0.0005 | $6 \times 10^{16}$ |
| Example 10 | 2.2 | 0.0004 | $3 \times 10^{16}$ |
| Example 11 | 2.3 | 0.0005 | $4 \times 10^{16}$ |
| Example 12 | 2.4 | 0.0007 | $7 \times 10^{16}$ |
| Example 13 | 2.7 | 0.0009 | $5 \times 10^{17}$ |
| Example 14 | 2.6 | 0.0008 | $8 \times 10^{16}$ |
| Compar. Ex. 1 | 3.0 | 0.0009 | $8 \times 10^{16}$ |
| Compar. Ex. 2 | 2.9 | 0.0008 | $5 \times 10^{16}$ |
| Compar. Ex. 3 | 3.1 | 0.0010 | $4 \times 10^{17}$ |
| Compar. Ex. 4 | 2.9 | 0.0009 | $5 \times 10^{16}$ |

In the above table 1, the insulators produced in the Examples all showed good in performance with respect to dielectric constant, dielectric loss tangent, insulation resistance and heat resistance. In particular, it is evident that they are superior in dielectric constant to the insulator produced in Comparative Example 1 and free of the monomer (1) of the present invention.

The insulator of Comparative Example 1, which was obtained by using glycidyl methacrylate in lieu of the monomer (1) and copolymerizing said glycidyl methacrylate with other monomers, was produced and evaluated for the purpose of comparison with Examples 1, 2, 3, 8, 9 and 10. The insulators of Comparative Examples 2 to 4, which were obtained by modification using glycidyl methacrylate in lieu of the monomer (1) of the present invention, were produced and evaluated for the purpose of comparison with Examples 4, 5, 6, 7, 11, 12, 13 and 14.

INDUSTRIAL APPLICABILITY

By subjecting the polymerizable resin of the present invention to cationic polymerization or radical polymerization, it is possible to form thin films comprising an insulating material excellent in heat resistance, solvent resistance, low water absorption, insulation property, low dielectric constant, adhesion, chemical resistance and so on. In particular, this insulator is suitable as an over coating material or interlayer insulating material to be used in circuit substrates for use in various kinds of electrical machinery and apparatus, electronic parts and semiconductor devices.

The range of application of the above polymerizable resin and insulator is not limited to the technical fields mentioned above but can be used in various fields, in particular in cases where the thin film is to be formed, making efficient use of the characteristics mentioned above, namely their excellent heat resistance, solvent resistance, low water absorption, insulation property, low dielectric constant, chemical resistance, etc.

What is claimed is:

1. A cured resin obtained by a curing method comprising subjecting, to cationic polymerization or radical polymerization, a curable resin which comprises a copolymer of a monomer (1) represented by the general formula (1) given below, wherein the monomer (1) has two ethylenic groups as shown below, and one or more monomers selected from the group consisting of monomers (2), (3), (5) and (6) respectively represented by the general formulas (2), (3), (5) and (6) given below, wherein the weight ratio of the monomer (1)/sum total of monomers (2), (3), (5) and (6) is 5/95 to 95/5 and the number average molecular weight of said copolymer is 2000 to 1,000,000;

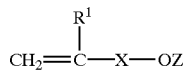
(1)

in the formula, $R^1$ represents a hydrogen atom or a methyl group, X represents $COOR^2$ or $OR^2$, $R^2$ represents an alkylene group containing 1 to 6 carbon atoms and may optionally be substituted with a hydroxyl group or a halogen atom, and Z represents a propenyl group or an allyl group;

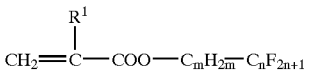
(2)

in the formula, n is an integer of 1 to 10;

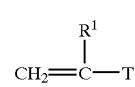
(3)

in the formula, $R^1$ represents a hydrogen atom or a methyl group, m is an integer of 0 to 6 and n is an integer of 1 to 10;

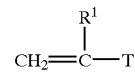
(5)

in the formula, $R^1$ represents a hydrogen atom or a methyl group, T represents $COOR^6$ or $OR^6$, and $R^6$ represents a cyclic alkyl or cyclic alkenyl group containing 3 to 15 carbon atoms and may partly be substituted with a hydroxyl group or a halogen atom;

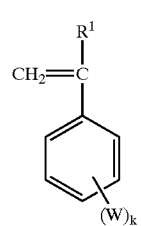
(6)

in the formula, $R^1$ represents a hydrogen atom or a methyl group, W represents an alkyl group, a hydroxyl group or a halogen atom and k is an integer of 0 to 5, and wherein one of the ethylenic groups in monomer (1) provides for the curing of the copolymer.

2. An insulator which comprises the cured resin according to claim 1.

3. An electrical machinery or apparatus part in which the insulator according to claim 2, is incorporated.

4. An electrical machinery or apparatus in which the insulator according to claim 2, is incorporated.

* * * * *

UNITED STATES PATENT AND TRADEMARK OFFICE
CERTIFICATE OF CORRECTION

PATENT NO. : 6,613,855 B1
DATED : September 2, 2003
INVENTOR(S) : Munekazu Satake et al.

It is certified that error appears in the above-identified patent and that said Letters Patent is hereby corrected as shown below:

<u>Title page,</u>
Item [30], Foreign Application Priority Data, please delete "Apr. 9, 1997" and insert -- Sept. 4, 1997 --.

Signed and Sealed this

Twenty-seventh Day of January, 2004

JON W. DUDAS
*Acting Director of the United States Patent and Trademark Office*